United States Patent [19]

Boe et al.

[11] 4,082,878

[45] Apr. 4, 1978

[54] ABSORBENT TEXTILE SHEET MATERIAL

[75] Inventors: Hans Boe, Augsburg, Germany; Ralf Hoehn, Chelmsford, Mass.; Bohuslav Tecl, Weinheim; Wilhelm Kirsch, Birkenau, both of Germany

[73] Assignee: Firma Carl Freudenberg, Weinheim an der Bergstrasse, Germany

[21] Appl. No.: 735,713

[22] Filed: Oct. 26, 1976

Related U.S. Application Data

[63] Continuation-in-part of Ser. No. 712,979, Aug. 9, 1976, abandoned.

[30] Foreign Application Priority Data

Aug. 16, 1975 Germany .............................. 2536440

[51] Int. Cl.$^2$ ................................................ B32B 3/30
[52] U.S. Cl. ..................................... 428/195; 427/261;
427/288; 427/373; 427/390 R; 428/290;
428/320; 428/341; 428/521
[58] Field of Search .............. 427/261, 262, 267, 280,
427/288, 372, 373, 384, 385, 390, 394, 407, 412,
413; 428/195, 198, 219, 284, 286, 289, 290, 310,
315, 320, 341, 492, 521

[56] References Cited

U.S. PATENT DOCUMENTS

| 2,545,952 | 3/1951 | Goldman | 428/198 |
| 3,093,502 | 6/1963 | Drelich | 428/198 |
| 3,958,055 | 5/1976 | Hadley et al. | 428/198 |
| 3,965,518 | 6/1976 | Muoio | 428/195 X |
| 3,965,519 | 6/1976 | Hermann | 428/195 X |

FOREIGN PATENT DOCUMENTS 1,560,738  3/1972  Germany.

Primary Examiner—Thomas J. Herbert, Jr.
Assistant Examiner—Bruce H. Hess
Attorney, Agent, or Firm—Burgess, Dinklage & Sprung

[57] ABSTRACT

An absorbent textile sheet material suitable for use as a cleaning cloth, skid-resistant underlayment or the like, comprising a consolidated nonwoven fabric coated on up to about 70% of both surfaces with binding agent present as a three-dimensionally superelevated printed pattern providing a squeegee-like action when wiped over a wet surface, is produced by impregnating a fibrous web with a binding agent and drying to form a coherent sheet material, applying to each surface of said sheet material a foamed dispersion comprising rubber, the foam being printed onto each surface to cover from about 30 to 70% of the surface, and heating to coagulate the foam and to leave on each surface a superelevated printed pattern of binder exerting a squeegee-like action in use. Advantageously the fibrous web weighs about 60 to 300 g/m$^2$, the foamed dispersion contains butadiene-acrylonitrile-styrene-rubber copolymer, is applied to each surface in amount sufficient to deposit about 20 to 40 g of rubber per square meter of surface in a final height of about 0.3 to 1.5 mm and is printed in a pattern which permits no straight lines longer than about 10 mm to be drawn on a surface without intersecting the superelevated pattern.

7 Claims, No Drawings

ABSORBENT TEXTILE SHEET MATERIAL

This application is a continuation-in-part of Application Ser. No. 712,979, filed Aug. 9, 1976, now abandoned.

BACKGROUND

The invention relates to an absorbent textile material in sheet form for use as a cleaning cloth, or as a non-skid underlayment or the like, consisting of a consolidated nonwoven material of natural and/or synthetic staple and/or continuous fibers which is surface-coated on both sides with a binding agent.

German Patent No. 1,560,738 has previously disclosed a porous, highly absorbent nonwoven material which is provided on both sides with a binding agent, especially a binding agent applied from a dispersion in the form of a foam. The binding agent uniformly covers the entire surface in the form of a film which partially penetrates into the nonwoven fabric. Thus an especially great resistance to abrasion is achieved. The nonwoven material is suitable, for example, as a household cleaning cloth, window wiping cloth or the like. Although the resistance to abrasion is greatly improved by the coating of binding agent, the coating modifies the characteristics of the inherently soft nonwoven fabric to make it more like a plastic product. Therefore, compromises must be made in accordance with the purpose of the material, in that either a very wear-resistant, but no longer essentially textile-like product is made by means of a correspondingly heavily applied coat of binding agent, or a soft cloth is made with a very thin binder coat but is not free from pilling.

THE INVENTION

It is the object of the invention to develop a sheet material on a nonwoven basis that is coated with binding agent such that, on the one hand, it will be resistant to abrasion and wear, and on the other hand it will be soft and cloth-like, while at the same time striving for an especially great ability to absorb water, on account of its preferred use as a household cleaning cloth such as a window wiping cloth or the like.

This object is accomplished by an absorbent textile material in sheet form consisting of a consolidated nonwoven fabric of natural and/or synthetic staple and/or continuous fibers which is surface-coated on both sides with binding agent, and which is characterized in that the surface coating provided on both sides is a three-dimensionally superelevated printed pattern capable of a squeegee-like action, and covers up to about 70% of the surface area of the nonwoven fabric, while avoiding continuous gaps.

The squeegee action is achieved when the moistened cloth is employed, in that the superelevated printed pattern is capable of wiping away liquid from the surface being cleaned, doing so in the manner of a window cleaning squeegee, the liquid being simultaneously absorbed by the nonwoven fabric. Despite the fact that only up to about 70% of the surface area of the nonwoven fabric is covered by the coating, excellent resistance to abrasion and wear and stabilization against pilling are achieved. To this end it is necessary that at least approximately 30% of the surface area on each side be coated and that the pattern have no gaps or channels passing all the way across the entire surface or comparatively large portions thereof. Patterns which are composed of bars and/or circles and/or honeycombs and/or wavy lines or the like have proven especially effective.

The nonwoven fabric is consolidated and, if desired, needled, the preliminary consolidation being able to be accomplished in a known manner by the use of a conventional binding agent, or else by the use of binding fibers which can be consolidated thermoplastically. The coating is then best performed by means of a known printing method using heat-sensitive foam binding agent. The binding agent dispersion desirably comprises copolymers of butadiene with styrene and/or acrylonitrile.

After the heat-sensitive binding agent dispersion has been printed on, the foam coagulates at a predetermined temperature, which is desirably between about 35° and 80° C and preferably about 40° to 50° C. The printed pattern is plainly superelevated, and during the drying it is absorbed by the nonwoven fabric only very slightly if at all. It is essential that no gaps or channels be formed which might interfere with or impair the squeegee action, or at least none that might cause a streaky drying of the cleaned surface.

The nonwoven fabric consists of known highly absorbent natural and/or synthetic staple and/or continuous fibers, the properties of which are entirely preserved, in contrast to the full-area coating of the prior art as described, for example, in German Pat. No. 1,560,783.

The fibers may comprise, for example, cotton, rayon, wool silk, cellulose acetate, cellulose triacetate, polyester, nylon, olefins, acrylics, and the like. They may range in denier from as little as 1 or less up to 50 or more, generally from about 1-25 and usually from about 1.4-4.5. The starting sheet material may have a fiber weight ranging from about 50-500 grams per square meter, generally from about 75 to 200 grams per square meter. It may initially be held together by application of a preliminary binder in the amount of about 2-40 and preferably about 5-20% of binder based on the fiber weight, for which purpose any conventional binders can be employed, e.g. polyvinyl acetate, acrylonitrile copolymers with butadiene, styrene and/or acrylates, etc. The print of the final binder should be in a pattern so there is no continuous straight line which can be drawn through binder free zones over a distance of more than about 10 cm and preferably no more than about 5 cm, especially less than about 1 cm. This can be accomplished by printing hexagonal, square, circular or other shapes in staggered, hexagonal or other arrangements.

Advantageously at least about 50% by weight of the fibers are absorptive such as cotton and/or rayon and the balance, if any, may comprise synthetic and/or man-made fibers such as polyester, nylon, acrylics, olefins, acetate, triacetate and the like. They may range in denier from as little as 1 or less up to 50 or more, generally from about 1-25 and usually from about 1.4-4.5. The starting sheet material may have a fiber weight ranging from about 50-500 grams per square meter, generally from about 75 to 200 grams per square meter.

It may initially be held together by application of a preliminary binder in the amount of about 10-40 and preferably about 20-30% of binder based on the fiber weight, for which purpose any conventional binders can be employed, e.g. polyvinyl acetate, acrylonitrile copolymers with butadiene, styrene, and/or acrylates, etc.

The print of the final binder should be in a pattern so there is no continuous straight line which can be drawn through binder free zones over a distance of more than about 10 cm and preferably no more than about 5 cm, especially less than about 1 cm. This can be accomplished by printing hexagonal, square, circular or other shapes in staggered, hexagonal or other arrangements.

The following examples concern absorbent sheet materials treated in accordance with the invention.

EXAMPLE 1

A matted fiber sheet comprising by weight cotton, 1.4 denier — 50%
rayon, 1.7 denier. — 50% and weighing about 100 g/m², is pre-needled in a known manner and then impregnated with a latex containing 15 parts by weight of 48-48-4 by weight butadiene-acrylonitrile-methacrylic acid, 1 part of sulfur, 10 parts of zinc oxide and 4 parts of zinc mercaptobenzthiazole as accelerant, with the balance water to a total of 100 parts. The material is dried and an intermediate product is thus formed which weighs about 140 g/m². The material is then provided on both sides with a lined stencil imprint, the printing mixture consisting of a foamed, heat-sensitive, 40% rubber dispersion which is composed, in principle, like the impregnating mixture described above, but additionally contains three weight-parts of a polyvinyl methyl ether per hundred parts of rubber, dry substance, as the heat sensitizing agent. The foam coagulates at approximately 50° C and upon drying forms a plainly superelevated coating adhering to the surface of the nonwoven material. After drying, the superelevated pattern of the stencil is plainly distinguished from the surface. The finished product weighs about 200 g/m²; in other words, 30 grams of printing mixture are applied per square meter to each side. About 50% of the surface area of the non-woven fabric is masked off by the imprint.

EXAMPLE 2

A matted fiber sheet comprising equal parts by weight of rayon of 1.7, 3 and 4.5 denier, weighing 85 g/m² is preneedled, impregnated and dried as in Example 1. The specific weight thus obtained amounts to 120 g/m². The material is drawn through a 15% solution of sodium chloride and calcium chloride in a ratio of 1 : 1. After drying, the material is found to have absorbed approximately 100% salt with respect to the weight of the sheet material. A continuous hexagon honeycomb pattern is printed with a line thickness of about 1 mm and a center-to-center spacing of about 10 mm. Per square meter approximately 25 grams of a foamed acrylonitrile-styrene-rubber polymer are imprinted upon the salted material, the polymer having been rendered heat sensitive with a polymeric siloxane solution sold under the trademark Bayer Coagulant WS and coagulating upon drying at about 40° C. The printed material is washed in warm water of about 60° C and dried. The final weight of the product is about 170 g/m².

EXAMPLE 3

A matted fiber sheet material comprising by weight cotton, 1.4 denier — 65%
polyester, 2.8 denier — 35% and weighing 75 g/m², is treated with an impregnating mixture containing two weight-parts of Glauber salt or sodium chloride for each part by weight of copolymer in the latex employed in Example 1. After drying, a specific weight of 175 g/m² is obtained.

The material is imprinted by means of a stencil with an irregular star pattern. The foamed printing mixture consists of a 50—50 weight mixture of ethyl acrylate and a 50—50 weight butadiene-acrylonitrile copolymer which has been rendered thermosensitive at 45° C with a polymeric siloxane solution. After washing and drying, an end product is obtained having a superelevated star pattern and a weight of about 165 g/m².

EXAMPLE 4

A matted fiber sheet material weighing 100 g/m² and comprising by weight cotton, 1.4 denier — 50%
rayon, 1.7 denier — 25%
polypropylene, 3.3 denier — 25% is needled and then additionally consolidated by heating in a hot air stream to fuse the melting fibers, and is then provided as in Example 1 with a stenciled imprint of a pattern of bars. After printing, the product is ready for use.

It will be appreciated that the instant specification and examples are set forth by way of illustration and not limitation, and that various modifications and changes may be made without departing from the spirit and scope of the present invention.

What is claimed is:

1. An absorbent textile sheet material suitable for use as a cleaning cloth, skid-resistant underlayment or the like, comprising a consolidated nonwoven fabric coated on from about 30% to about 70% of both surfaces with a coagulated foamed dispersion comprising rubber and present as a three-dimensionally superelevated printed pattern providing a squeegee-like action when wiped over a wet surface.

2. An absorbent textile sheet material according to claim 1, wherein the squeegee-acting super-elevated pattern comprises a heat-sensitive cross-linked butadiene-acrylonitrile-styrene-rubber copolymer.

3. An absorbent textile sheet material according to claim 1, wherein the superelevated squeegee-acting pattern permits no straight lines longer than about 10 mm to be drawn on a surface without intersecting the superelevated pattern.

4. An absorbent textile sheet material according to claim 1, wherein the superelevated pattern is printed in a regular geometric pattern.

5. An absorbent textile sheet material according to claim 4, wherein the superelevated squeegee-acting pattern permits no straight lines longer than about 5 mm to be drawn on a surface without intersecting the super-elevated pattern, the sheet material having a fiber weight of about 60 to 300 g/m², a superelevated rubber weight on each surface of about 20 to 40 g/m² and a superelevated rubber height of about 0.3 to 1.5 mm.

6. A process for producing an absorbent textile sheet material according to claim 1, comprising impregnating a fibrous web with a binding agent and drying to form a coherent sheet material, applying to each surface of said sheet material a foamed dispersion comprising rubber, the foam being printed onto each surface to cover from about 30 to 70% of the surface, and heating to coagulate the foam and to leave on each surface a superelevated printed pattern of rubber exerting a squeegee-like action in use.

7. A process according to claim 6, wherein the fibrous web weighs about 60 to 300 g/m², the foamed dispersion contains butadiene-acrylonitrile-styrene-rubber copolymer, is applied to each surface in amount sufficient to deposit about 20 to 40 g of copolymer per square meter of surface in a final height of about 0.3 to 1.5 mm and is printed in a pattern which permits no straight lines longer than about 1 mm to be drawn on a surface without intersecting the superelevated pattern.

* * * * *